(12) United States Patent
Nagao

(10) Patent No.: US 7,400,055 B2
(45) Date of Patent: Jul. 15, 2008

(54) WIND TURBINE GENERATOR

(75) Inventor: Toru Nagao, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/700,024

(22) Filed: Jan. 31, 2007

(65) Prior Publication Data

US 2007/0176428 A1 Aug. 2, 2007

(30) Foreign Application Priority Data

Feb. 1, 2006 (JP) ............................. 2006-024233

(51) Int. Cl.
F03D 9/00 (2006.01)
H02P 9/04 (2006.01)

(52) U.S. Cl. .......................................... 290/44; 290/55

(58) Field of Classification Search .................. 290/44, 290/55, 54, 43; 146/132 B; 52/40; 415/7, 415/2.1, 4.2, 907
See application file for complete search history.

(56) References Cited

U.S. PATENT DOCUMENTS

| | | | |
|---|---|---|---|
| 6,672,837 B1 * | 1/2004 | Veldkamp et al. ........... 416/144 |
| 6,946,751 B2 * | 9/2005 | Yoshida et al. ................ 290/44 |
| 7,279,802 B2 * | 10/2007 | Pasuri .......................... 290/44 |
| 2005/0012339 A1 * | 1/2005 | Mikhail et al. ................ 290/44 |
| 2006/0033338 A1 | 2/2006 | Wilson |
| 2006/0066111 A1 * | 3/2006 | Suryanarayanan et al. .... 290/44 |
| 2007/0075546 A1 * | 4/2007 | Avagliano et al. ............ 290/44 |
| 2007/0182162 A1 * | 8/2007 | McClintic .................... 290/55 |

FOREIGN PATENT DOCUMENTS

| | | |
|---|---|---|
| EP | 1 626 175 A1 | 2/2006 |
| EP | 1 643 122 A2 | 4/2006 |
| EP | 1 719 910 A1 | 11/2006 |
| JP | 2000-205108 A | 7/2000 |
| WO | WO-95/21327 A1 | 8/1995 |
| WO | WO-99/63219 A1 | 12/1999 |

* cited by examiner

*Primary Examiner*—Julio C. Gonzalez
(74) *Attorney, Agent, or Firm*—Birch, Stewart, Kolasch & Birch, LLP

(57) ABSTRACT

A wind turbine generator includes: a tower; a rotor supported by the tower to rotate around a rotational axis which is not parallel with an axis direction of the tower by wind power; a generator driven by a rotational force of the rotor; a sensor that detects vibration component in a direction perpendicular to the rotational axis of the rotor; and a control device that controls the rotor so that fluctuation of the rotor is caused to suppress the vibration component.

20 Claims, 9 Drawing Sheets

WIND TURBINE GENERATOR

CROSS-REFERENCE TO RELATED APPLICATION

This application claims priority to Japanese Patent Application No. 2006-024233 filed on Feb. 1, 2006, which is incorporated herein by reference in its entirety.

BACKGROUND OF THE INVENTION

1. Field of the Invention

The present invention relates to a vibration control of a wind turbine generator.

2. Description of Related Art

Presently, in order to stably generate electric power from natural wind, a wind turbine generator utilizing a horizontal axis wind turbine has been proposed and implemented. Such a wind turbine generator includes a rotor, a nacelle, and a tower. The rotor includes a hub and blades. The nacelle is connected with the hub and supports the rotor through a main shaft extending in an approximately horizontal direction. The tower is disposed in an approximately perpendicular direction and supports the nacelle. In the nacelle a generator connected with the main shaft is provided to compose a wind turbine generator, which generates electric power by converting the rotation energy of the rotor rotated by the wind into electric energy.

In such a wind turbine generator, in order to maintain an appropriate rotation speed of the rotor, electric energy to be taken out from the generator is regularly controlled according to the wind strength.

In this control process, the torque of the rotor may fluctuate and become a vibration source. As the rotor is located on the tower which is elongated and low in rigidity, when the vibration caused by a fluctuation in torque synchronizes with the resonance frequency of the tower, the vibration may develop into a vibration of the entire windmill.

Besides the fluctuation in torque due to rotation control of the rotor, vibration of a windmill is caused by various types of vibrations such as vibration due to Karman vortex generated by the tower, resonance of the speed-increasing gear, the rotor, the generator and the drive axis, and vibration due to bending or torsion of construction.

JP-tokukai-2000-205108 discloses a wind turbine generator with a vibration control device disposed on the top of the tower. The vibration control device has a mass body, a damper device and the like, and the wind turbine generator has a vibration control function to reduce tower vibration.

However, even in the above-mentioned conventional technology, there are problems such as the followings.

The wind turbine generator as recited in the patent document additionally requires a vibration control device, which leads to additional cost. Further, because the vibration control device is to be installed in the tower, it may not be possible to install the vibration control device in a windmill utilizing inside of the tower as a passage leading into an upper part of the windmill. On the other hand, it may not be possible to have a passage inside the tower if the vibration control device is installed.

SUMMARY OF THE INVENTION

The present invention is developed in view of the above problems regarding the conventional technology. An object of the invention is to provide a wind turbine generator which enables controlling of a fluctuation in torque loaded on the rotor, to suppress or prevent vibration of the windmill.

In order to solve the problems described above, in accordance with a first aspect of the invention, the wind turbine generator comprises: a tower; a rotor supported by the tower to rotate around a rotational axis which is not parallel with an axis direction of the tower, by wind power; a generator driven by a rotational force of the rotor; a sensor that detects vibration component in a direction perpendicular to the rotational axis of the rotor; and a control device that controls the rotor so that fluctuation of the rotor is caused to suppress the vibration component.

In accordance with the first aspect of the invention, the wind turbine generator comprises the rotor supported by the tower to rotate around a rotational axis which is not parallel with the axis direction of the tower by wind power, and the sensor that detects vibration component in the direction perpendicular to the rotational axis of the rotor and the control device that controls the rotor so that the fluctuation of the rotor is caused to suppress the vibration component.

Preferably, the wind turbine generator further comprises: an analyzer that analyzes frequency and phase of the vibration component detected by the sensor; wherein the control device controls the rotor so that the fluctuation of the rotor is caused in opposite phase to the phase analyzed by the analyzer, and at the frequency as analyzed by analyzer, when a signal outputted by the sensor exceeds a predetermined threshold value.

According to such a generator, the wind-turbine generator further comprises the analyzer that analyzes frequency and phase of the vibration component detected by the sensor.

When the signal outputted by the sensor exceeds a predetermined threshold value, namely when the vibration in the direction perpendicular to the rotational axis of the rotor is beyond a certain degree, the fluctuation of the rotor is caused by the control performed by the control device in opposite phase and at same frequency of that vibration.

By this fluctuation, a moment is caused in the tower to suppress the detected vibration, and the vibration is thereby suppressed. By suppressing vibration, a predetermined level of power generation performance can be maintained.

Preferably, the wind turbine generator further comprises: an analyzer that analyzes frequency of the vibration component detected by the sensor; wherein the control device controls the rotor so as to avoid fluctuation of the rotor at the frequency analyzed by the analyzer, when a signal outputted by the sensor exceeds a predetermined threshold value.

According to such a generator, the wind turbine generator further comprises the analyzer that analyzes frequency of the vibration component detected by the sensor.

When the signal outputted by the sensor exceeds a predetermined threshold value, namely when the vibration in the direction perpendicular to the rotational axis of the rotor is beyond a certain degree, the rotor is controlled by the control device so as to avoid fluctuation of the rotor at the frequency of that vibration.

By this control, resonance with the fluctuation of the rotor as the source of vibration can be prevented. By preventing resonance, a predetermined level of power generation performance can be maintained.

Preferably, the wind turbine generator further comprises: an analyzer that analyzes phase of the vibration component detected by the sensor; wherein the control device controls the rotor so that the fluctuation of frequency of the rotor is caused in opposite phase to the phase analyzed by the analyzer, and at a predetermined frequency, when a signal outputted by the sensor exceeds a predetermined threshold value.

Preferably, the control device controls the rotor so as to avoid fluctuation of the rotor at a predetermined frequency, when a signal outputted by the sensor exceeds a predetermined threshold value.

According to such a generator, the same effects as the above invention can be obtained by setting the control device at a predetermined frequency such as the resonance frequency obtained with respect to each windmill.

Preferably, the control device controls the rotor by controlling either one or both of the generator and the pitch angle of a blade which composes the rotor.

According to such a generator, the rotor can be controlled, by controlling the generator to control the load torque on the rotor applied by the generator, or otherwise by controlling the pitch angle of the blade composing the rotor to adjust the drive torque on the rotor applied by the wind. The rotor can be controlled also by controlling both of the above. Regarding a wind turbine generator with the pitch angle of its blade fixed and the load of its generator adjustable, the invention is operable by controlling the generator. Regarding a wind turbine generator with the load of its generator fixed and the pitch angle of its blade adjustable, the invention is operable by controlling the pitch angle of the blade.

BRIEF DESCRIPTION OF THE DRAWINGS

The present invention will become more fully understood from the detailed description given hereinbelow and the accompanying drawing which are given by way of illustration only, and thus are not intended as a definition of the limits of the present invention, and wherein.

DETAILED DESCRIPTION OF THE INVENTION

First Embodiment

Now, the first embodiment will be explained.

Figure 1:
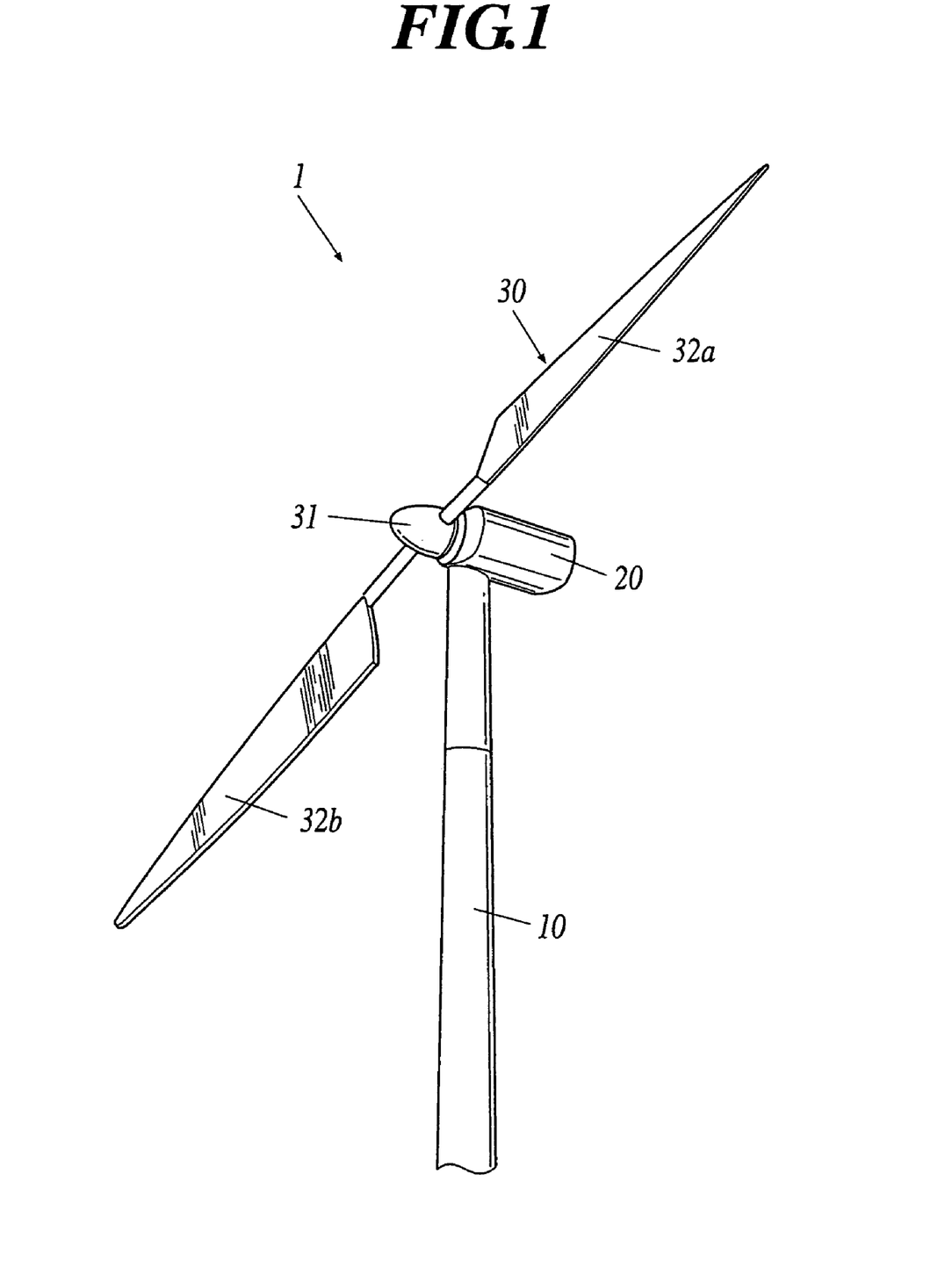
FIG. 1 is a perspective view showing a wind turbine generator 1 of the first to fourth embodiments of the invention.

FIG. 1 is a perspective view showing the external appearance of a wind turbine generator 1 of the invention. The wind turbine generator 1 utilizes a horizontal axis wind turbine. The wind turbine generator 1 comprises a tower 10, a nacelle 20 disposed on the top of the tower 10, a main shaft (not shown) supported by and extending from the nacelle 20 in the approximately horizontal direction of the nacelle 20, blades 32a and 32b attached to the main shaft through a hub 31.

In the nacelle 20, various machinery such as a generator, a gear box, a control device and the like are installed. The nacelle 20 is rotatably disposed on the top of the tower 10.

A rotor 30 has the hub 31 attached to an end on the main shaft, and the two blades 32a and 32b attached to the hub 31. The windmill with two blades is shown just as an example; any number of blades will be appropriate. In the hub 31, a pitch drive device is located to drive the pitch of the blades 32a and 32b.

Figure 2:
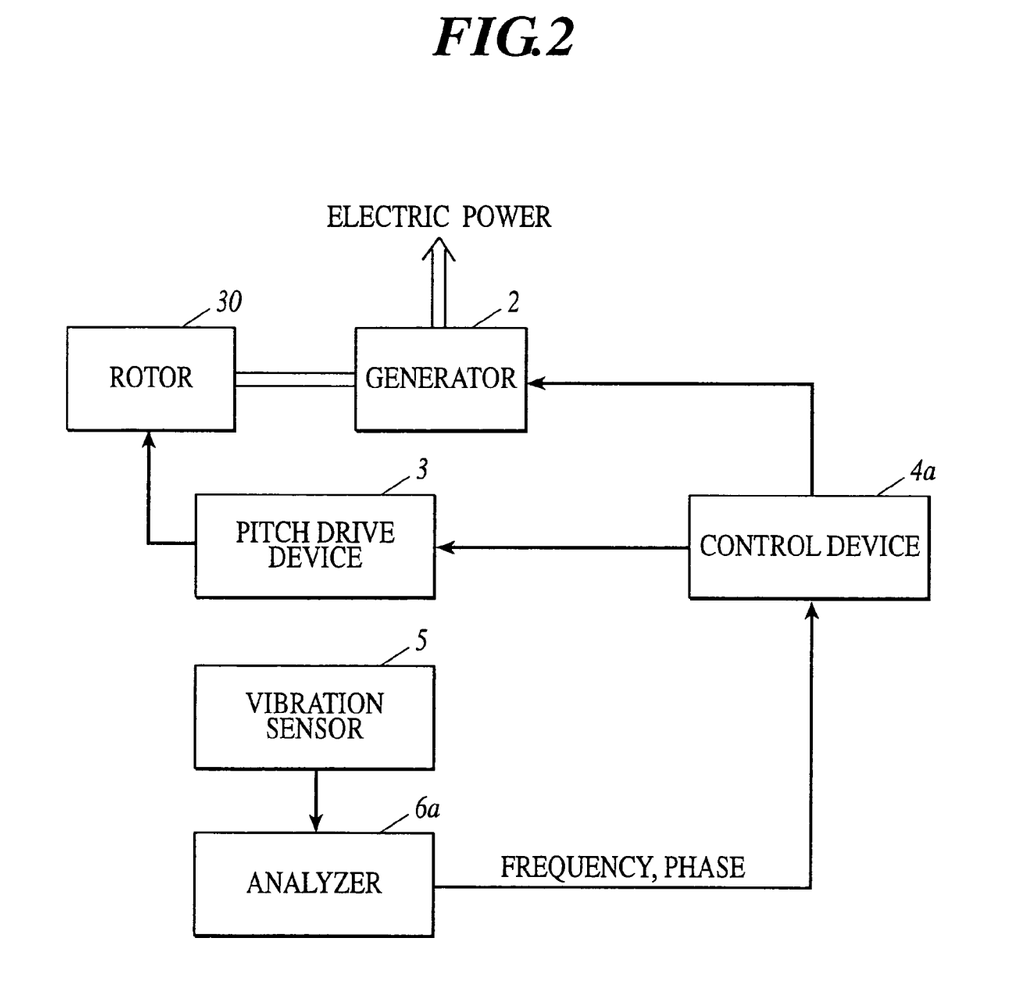
FIG. 2 is a block diagram of a control system of the first and second embodiments of the invention.

FIG. 2 is a block diagram of a control system of the embodiment. A control device 4a controls the generator 2 and the pitch drive device 4. A vibration sensor 5 is a sensor that detects a vibration component in the direction perpendicular to a rotational axis of the rotor 30, and includes an accelerometer, a piezo-electric element, a strain gage and the like, which are mounted in the tower 10, in the nacelle 20, on a drive system, the blades 32a and 32b or the like. The vibration sensor 5 outputs the detected signal to an analyzer 6a.

The analyzer 6a analyses frequency and phase of the vibration components of the signal detected by the vibration sensor 5. The analyzer 6a receives the signal outputted by the vibration sensor 5, performs frequency analysis based on FFT (Fast Fourier Transform) and phase analysis based on real-time measurement, and then outputs the signal outputted by the vibration sensor 5, and the analyzed frequency and phase to the control device 4a.

Figure 3:
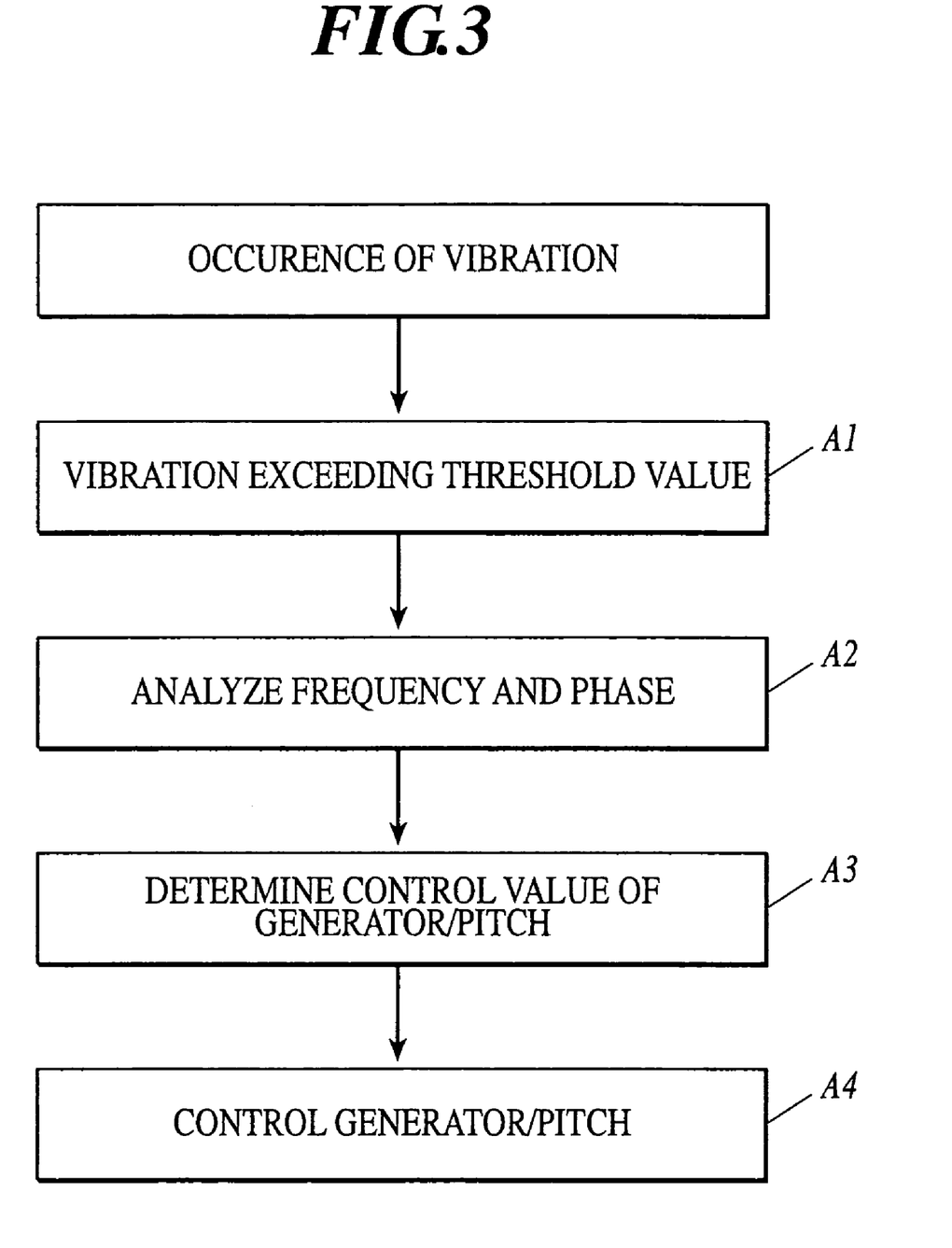
FIG. 3 is a flow chart of vibration control of the first embodiment of the invention.

FIG. 3 is a flow chart of vibration control of the embodiment. When the signal outputted by the vibration sensor 5 exceeds a predetermined threshold value (step Al), the analyzer 6a analyses the frequency and phase of the vibration based on the signal outputted by the vibration sensor 5, and outputs the signal and an analysis result to the control device 4a (step A2). The control device 4a determines the control value of the generator 2 so that a fluctuation is caused on the rotor 30 in the opposite phase of the phase analyzed by the analyzer 6a, and at the frequency analyzed by the analyzer 6a (step A3). The control device 4a then controls the rotor 30 (step A4).

When there is a plurality of vibrations combined, the analyzer 6a selects and analyzes the vibration component having the most impact on the vibration of the top portion of the tower 10. Usually, the component with the highest amplitude is selected.

The generator has the rotor and a stator coil. The rotor of the generator is mechanically connected with the rotor 30 of a windmill via the main shaft and a speed-increasing gear, so as to be rotationally driven. By electrically controlling the electric current in the stator coil, the load torque applied on the rotor 30 can be controlled.

Figure 4A:
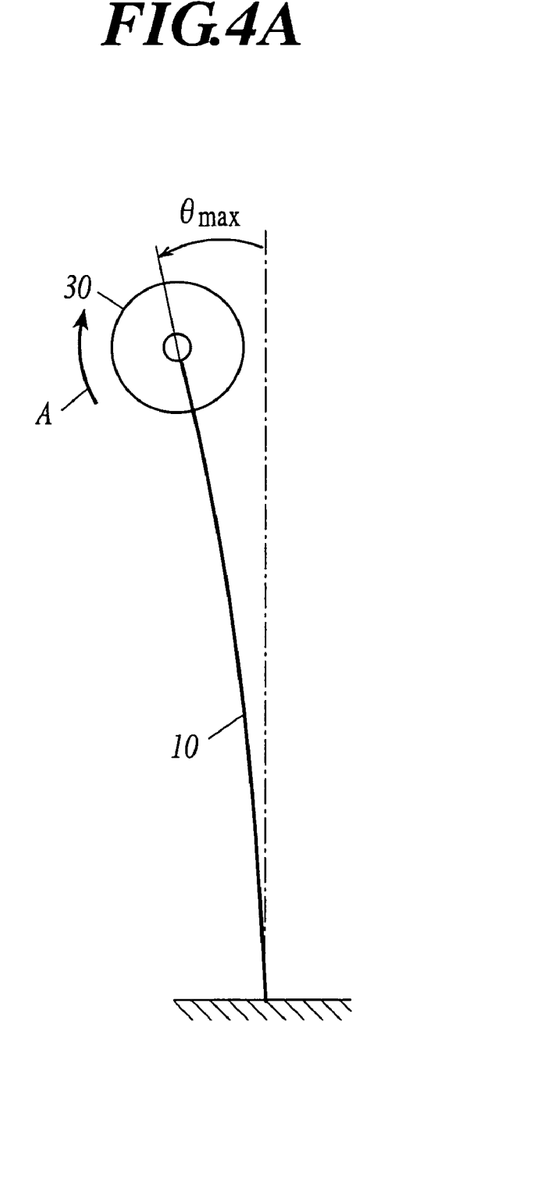
FIG. 4 is a schematic view of a windmill to explain the principle of vibration control of the invention.
Figure 4B:
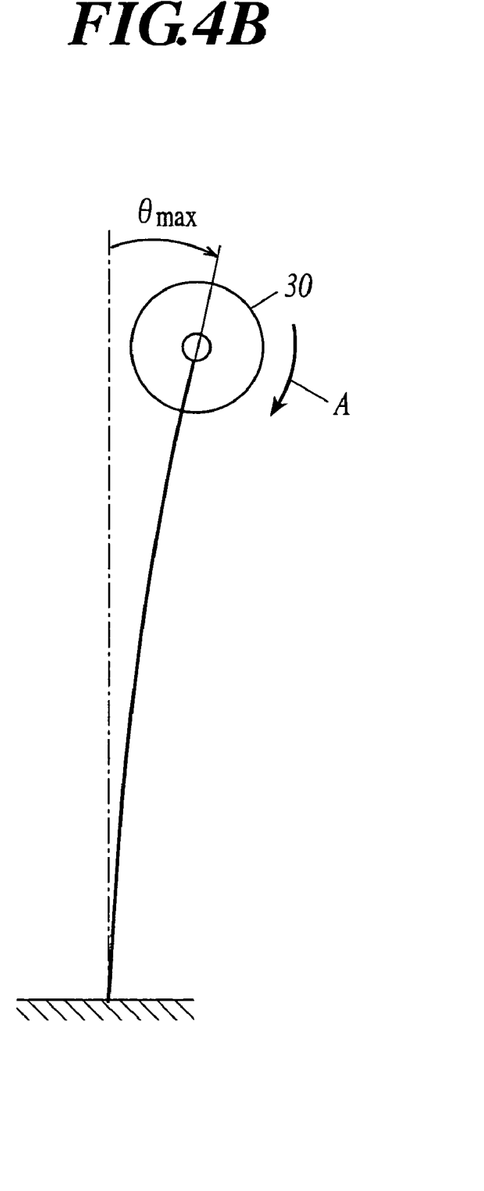

FIG. 4 is a schematic view of a windmill. As shown in FIG. 4, the maximum deflection angle θ of the deflection vibration of the tower 10 is to be indicated as θmax. During transfer from the state of FIG. 4A to that of FIG. 4B, the tower 10 bends in the same direction as the rotating direction A of the rotor 30. During this time, the electric current value in the stator coil of the generator 2 is reduced. This causes the load torque of the rotor 30 to reduce, and the reaction accompanying the reduction of the load torque of the rotor 30 acts on the tower as a moment to reduce the deflection angle θ, thereby weakening the vibration.

On the other hand, during transfer from the state of FIG. 4B to that of FIG. 4A, the tower 10 bends in the opposite direction of the rotating direction A of the rotor 30. During this time, the electric current value in the stator coil of the generator 2 is increased. This causes the load torque of the rotor 30 to increase, and the reaction accompanying the increase of the load torque of the rotor 30 acts on the tower as a moment to reduce the deflection angle θ, thereby weakening the vibration. The load torque is kept to the degree that it will not stop the rotation of the rotor 30.

The controlling of the generator 2 as described above is repeated, by causing various degrees of changes corresponding to the same frequency and opposite phase of the present vibration, to suppress the present vibration. The controlled waveform need not be identical with the waveform of the detected vibration; the control waveform may be a rectangular wave of a wave pulse or the like.

As an alternative to the controlling of the generator 2 as described above, the pitch angle of the blades can be controlled to control vibration. During transfer from the state of FIG. 4A to that of FIG. 4B, the pitch angle is changed to increase gradually the rotational force of the rotor 30 in the direction of the arrow A. This causes the drive torque applied to the rotor 30 to gradually increase, and the reaction accompanying the increase of the drive torque of the rotor 30 acts on the tower as a moment to reduce the deflection angle θ, thereby weakening the vibration.

On the other hand, during transfer from the state of FIG. 4B to that of FIG. 4A, the pitch angle is changed to reduce the rotational force of the rotor 30 in the direction of the arrow A. This causes the drive torque to the rotor 30 to gradually reduce, and the reaction accompanying the reduction of the drive torque of the rotor 30 acts on the tower as a moment to reduce the deflection angle θ, thereby weakening the vibration.

The pitch angle control as described above is repeated, by causing various degrees of changes corresponding to the same frequency and opposite phase of the present vibration, to suppress the present vibration.

Further, the generator control and the pitch angle control as described above are repeatedly performed by repeatedly applying to the rotor the fluctuation corresponding to the same frequency and opposite phase of the present vibration, to suppress the present vibration.

The above vibration control is repeated until the signal outputted by the sensor 5 falls below a predetermined threshold value. The vibration control is to be performed at real-time, and delays should be minimal.

Second Embodiment

Next, the second embodiment will be explained. The present embodiment is operable, as the first embodiment described above, with the structure shown in FIGS. 1 and 2. It is sufficient for the analyzer 6a to analyze and output only the frequency.

Figure 5:
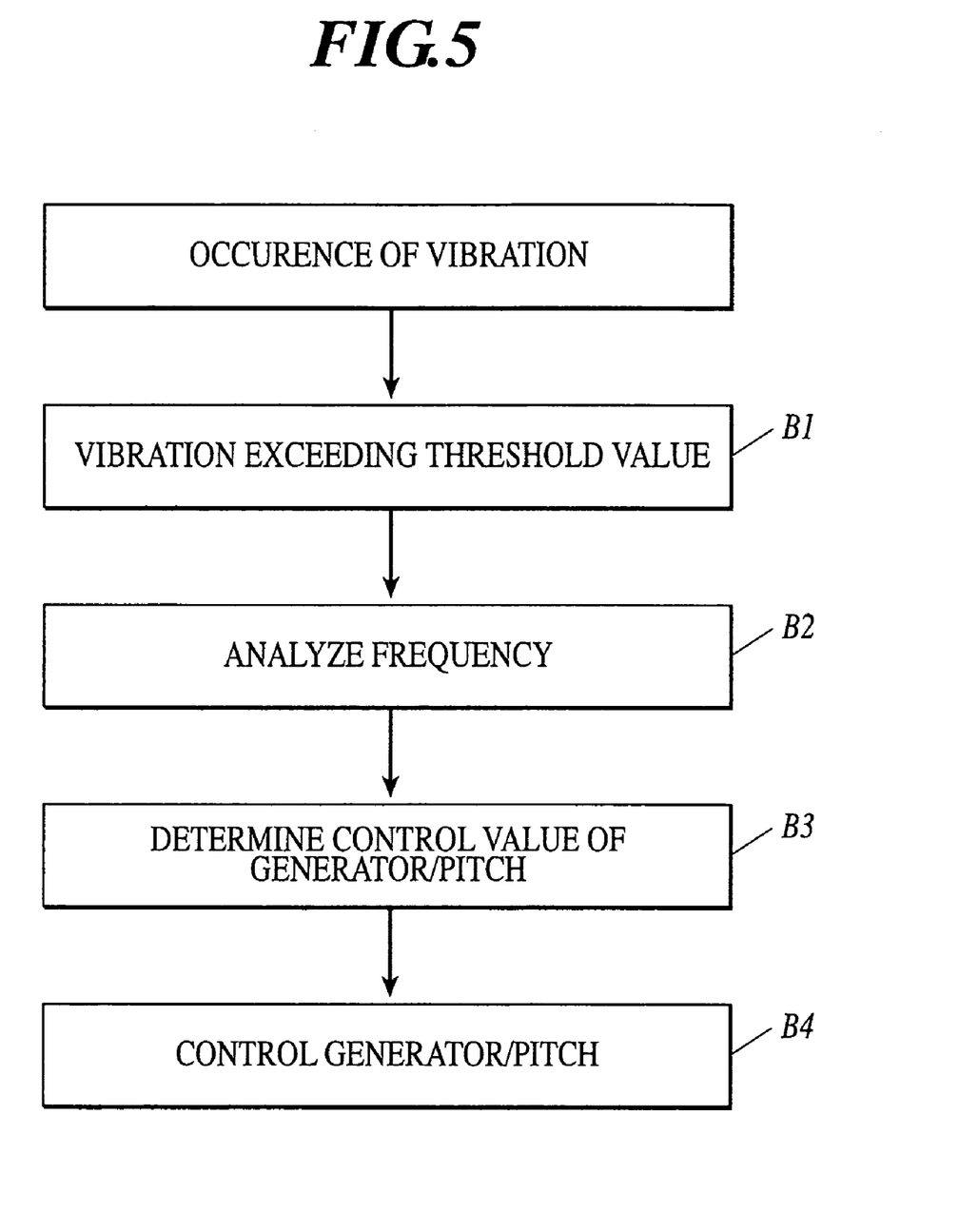
FIG. 5 is a flow chart of vibration control of the second embodiment of the invention.

In the embodiment, the following vibration control is performed. FIG. 5 is a flow chart of vibration control of the embodiment. When the signal outputted by the vibration sensor 5 exceeds a predetermined threshold (step B1), the analyzer 6a analyses the frequency of the vibration based on the signal outputted by the vibration sensor 5, to output the signal and the analysis result to the control device 4a (step B2). When controlling to cause fluctuation regarding the rotor 30 such as changing the load of the generator 2, changing the pitch angle of the blades, the control device 4a determines the control value of the generator 2 and/or a pitch drive device 3 so as to avoid fluctuation of the rotor 30 at the frequency analyzed by the analyzer 6a (step B3). The control device 4a then controls the rotor 30 (step B4). Specifically, the control device 4a specifies the frequency that should be avoided based on the frequency range of the present vibration, and controls to maintain the frequency at a higher or a lower level than that frequency range.

Resonance of the rotor 30 and the tower 10 can be avoided because the fluctuation caused in the rotor 30 has a different frequency from the present vibration. For example, when the pitch angle and/or the load of the generator is to be changed and optimized according to the change of wind speed, the fluctuation of the rotor 30 does not need to be controlled in particular when the signal outputted by the vibration sensor 5 does not exceed a predetermined threshold. However, when the signal outputted by the vibration sensor 5 does exceed a predetermined threshold, the rotor 30 is controlled as described above to prevent the frequency of the rotor 30 from fluctuating to the natural frequency of the tower 10.

The above described vibration prevention control is repeated until the signal outputted by the vibration sensor 5 falls below a predetermined threshold value.

Third Embodiment

Figure 6:
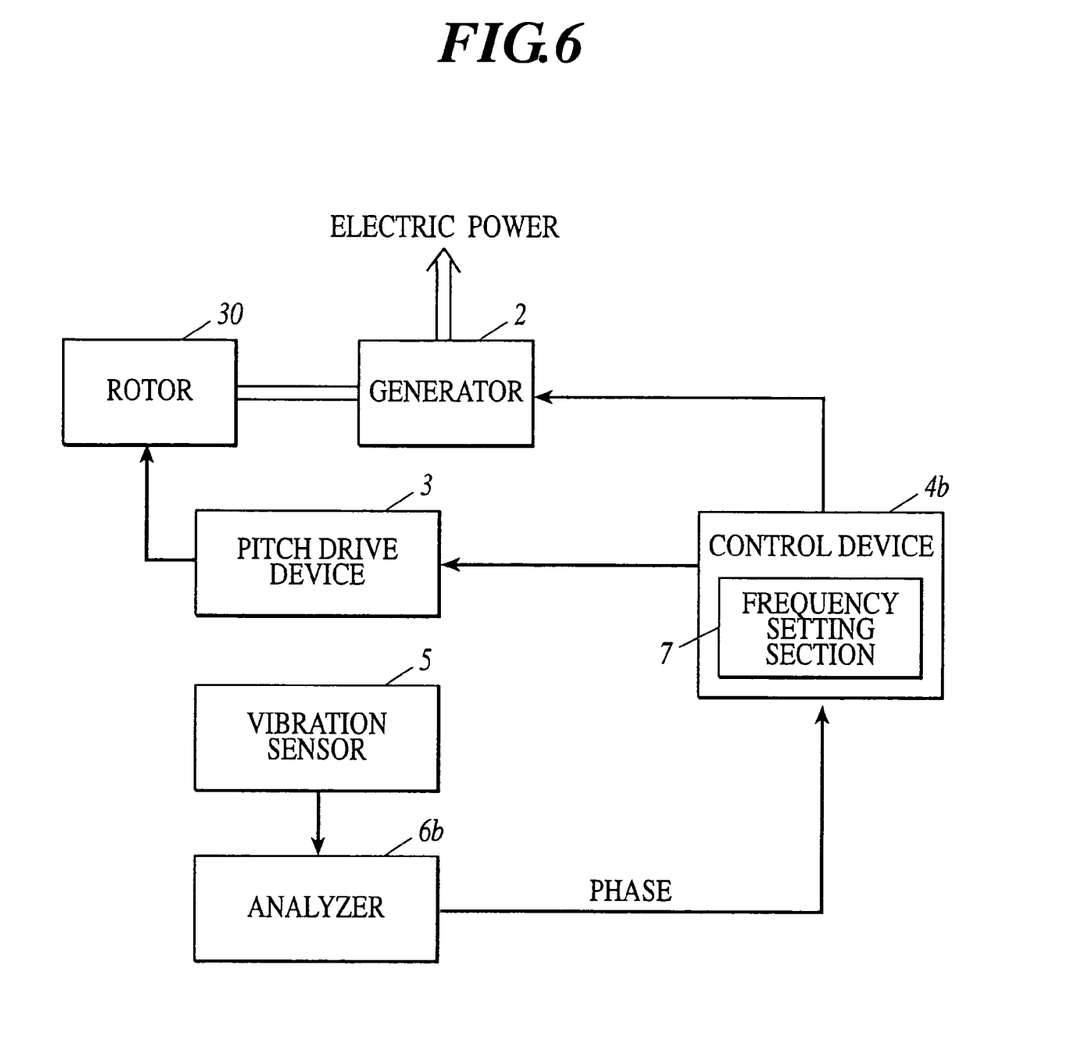
FIG. 6 is a block diagram of a control system of the third embodiment of the invention.

Next, the third embodiment will be explained. The present embodiment is operable, as the first embodiment described above, with the structure shown in FIG. 1. FIG. 6 is a block diagram of a control system. The rotor 30, the generator 2, the pitch drive device 3, and the vibration sensor 5 are identical with those in the first embodiment, while a control device 4b and an analyzer 6b are different from those in the first embodiment.

The analyzer 6b in the present embodiment is for analyzing the phase of the vibration component detected by the vibration sensor 5; the analyzer 6b receives the signal outputted by the vibration sensor 5, performs phase analysis based on real-time measurement, and outputs the signal outputted by the vibration sensor 5 together with the analyzed phase to the control device 4b.

The control device 4b includes a frequency setting section 7. The frequency setting section 7 is disposed in a storage device provided in the control device 4b. The frequency setting section 7 is set at a predetermined frequency written at the time of manufacturing or the like. The control device 4b performs the vibration control as described below. A predetermined frequency here is meant to be the natural frequency of this windmill.

Figure 7:
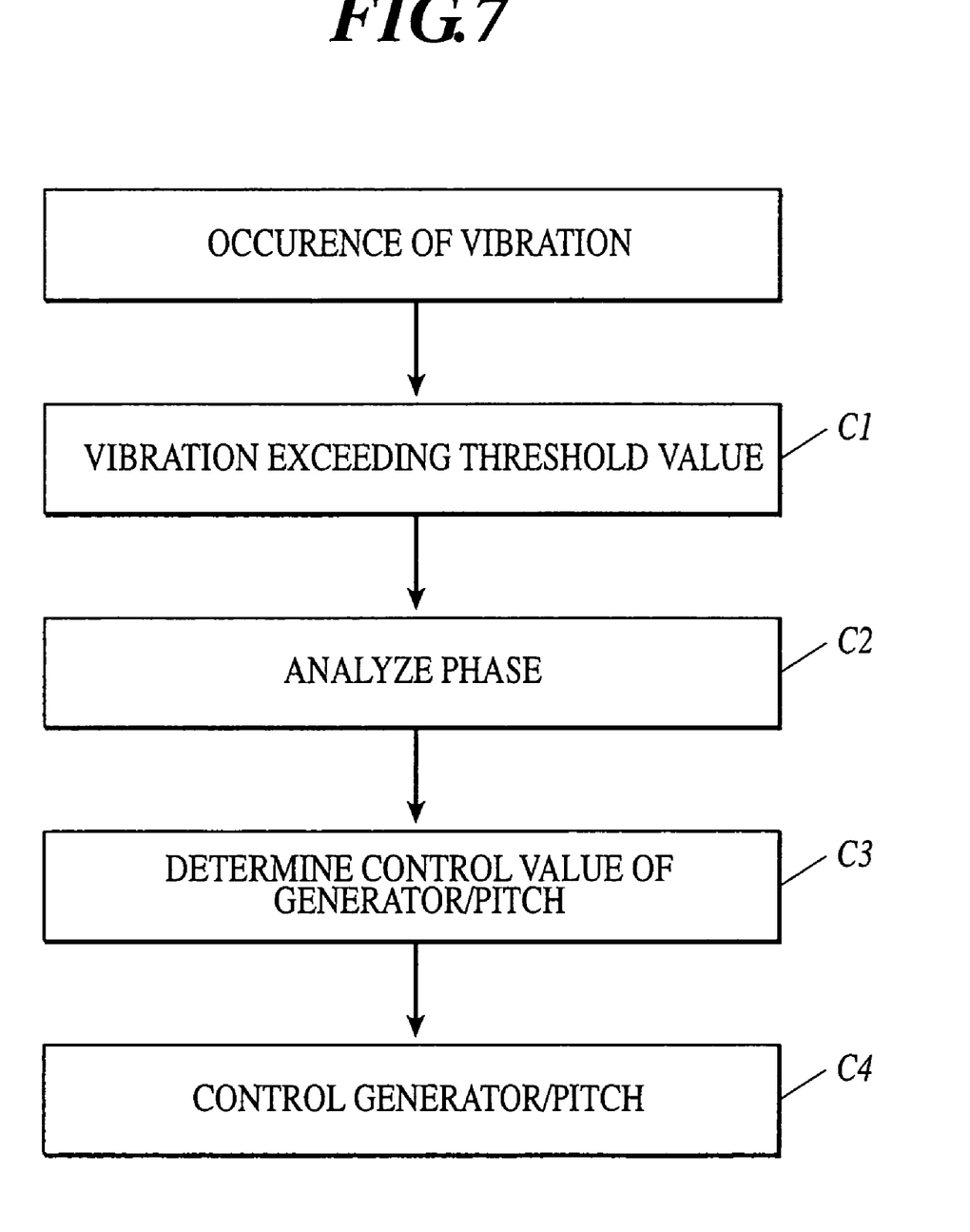
FIG. 7 is a flow chart of a vibration control of the third embodiment of the invention.

FIG. 7 is a flow chart of vibration control of the embodiment. When the signal outputted by the vibration sensor 5 exceeds a predetermined threshold value (step C1), the analyzer 6b analyzes the phase of the vibration based on the signal outputted by the vibration sensor 5, and outputs to the control device 4b (step C2). The control device 4b determines the control value of the generator 2 and/or the pitch drive device 3 so that fluctuation of frequency of the rotor 30 is caused in opposite phase of the phase as analyzed by the analyzer 6b, and at the frequency as set by the frequency setting section 7 (step C3). The control device 4b then controls the rotor 30 (step C4).

As described above, while the rotor 30 is controlled according to the frequency detected and analyzed in the first embodiment, it is according to a predetermined frequency that the rotor 30 is controlled in the present embodiment. The embodiment is otherwise the same as the first embodiment.

Fourth Embodiment

Figure 8:
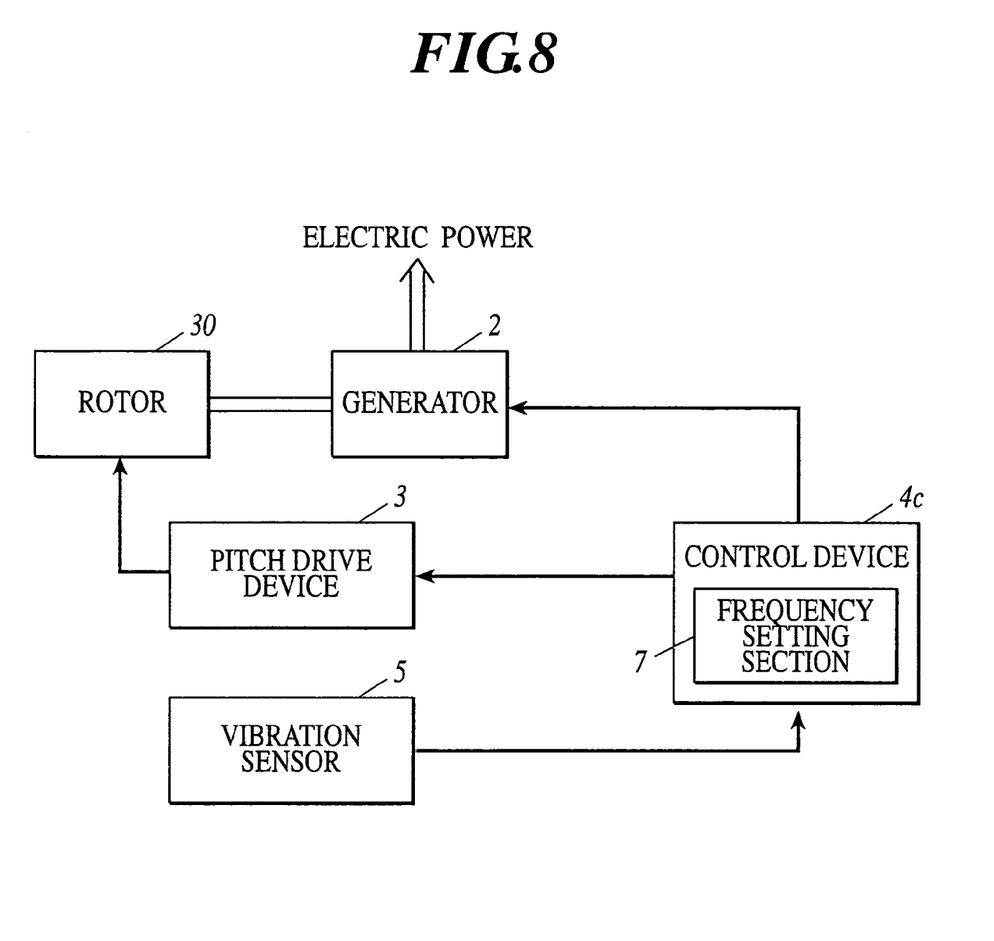
FIG. 8 is a block diagram of a control system of the fourth embodiment of the invention.

Next, the fourth embodiment will be explained. The present embodiment is operable, as the first embodiment described above, with the structure shown in FIG. 1. FIG. 8 is a block diagram of a control system. The rotor 30, the generator 2 the pitch drive device 3, and the vibration sensor 5 are identical with those in the first embodiment, while a control device 4c is different from that in the first embodiment. No analyzer is needed.

The control device 4c includes a frequency setting section 7. The frequency setting section 7 is disposed in a storage device provided in the control device 4c. The frequency setting section 7 is set at a predetermined frequency range written at the time of manufacturing or the like. The control device 4c performs the vibration control as described below. A predetermined frequency range here is meant to be the natural frequency of this windmill.

Figure 9:
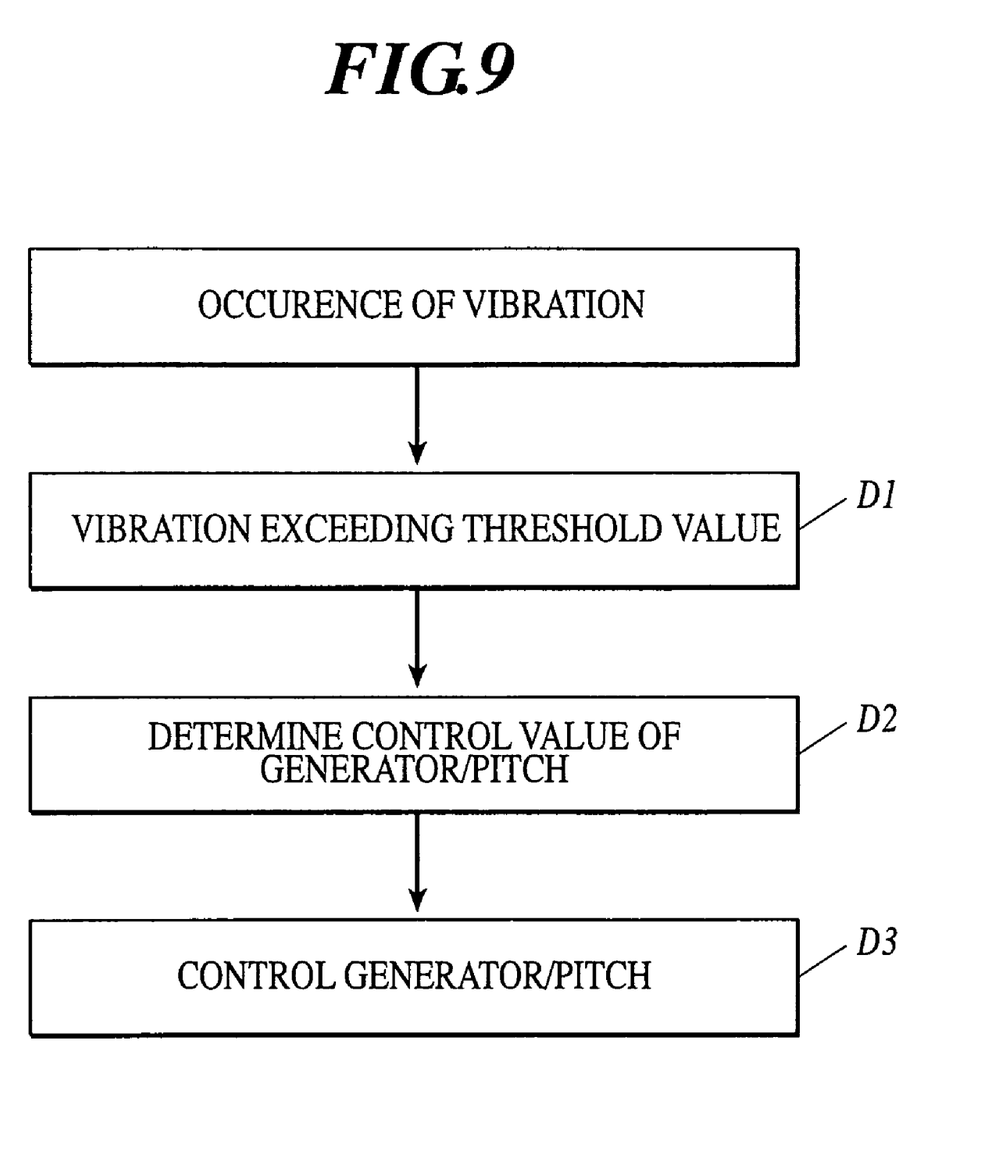
FIG. 9 is a flow chart of a vibration control of the fourth embodiment of the invention.

FIG. 9 is a flow chart of vibration control of the embodiment. When the signal outputted by the vibration sensor 5 exceeds a predetermined threshold value (step D1), the control device 4c determines the control value of the generator 2 and/or the pitch drive device 3 so as to avoid fluctuation of the rotor 30 at the frequency range as set by the frequency setting section 7 (step D2). The control device 4c then controls the rotor 30 (step D3). In other words, the control device 4c controls the rotor 30 to maintain the frequency higher or lower than the frequency range set by the frequency setting section 7.

As stated above, while the rotor 30 is controlled according to the frequency detected and analyzed in the second embodiment, it is according to a predetermined frequency that the rotor 30 is controlled in the present embodiment. The embodiment is otherwise the same as the second embodiment.

While there has been described in connection with the embodiments of the present invention, it is to be understood to those skilled in the art that various changes and modifications may be made therein without departing form the present invention, and it is aimed, therefore, to cover in the appended claims all such changes and modifications as fall within the true spirit and scope of the present invention.

What is claimed is:

1. A wind turbine generator, comprising:
   a tower;
   a rotor supported by the tower to rotate around a rotational axis which is not parallel with an axis direction of the tower, by wind power;
   a generator driven by a rotational force of the rotor;
   a sensor that detects a vibration component in a direction perpendicular to the rotational axis of the rotor;
   a control device that controls the rotor so that fluctuation of the rotor is caused to suppress the vibration component; and
   an analyzer that analyzes phase of the vibration component detected by the sensor,
   wherein the control device controls the rotor so that the fluctuation of the rotor is caused in opposite phase to phase analyzed by the analyzer.

2. The wind turbine generator as claimed in claim 1,
   wherein the analyzer analyzes frequency and phase of the vibration component detected by the sensor; and
   the control device controls the rotor so that the fluctuation of the rotor is caused in opposite phase to the phase analyzed by the analyzer, and at the frequency as analyzed by analyzer.

3. The wind turbine generator as claimed in claim 1,
   wherein the analyzer analyzes frequency of the vibration component detected by the sensor, and
   the control device controls the rotor so as to avoid fluctuation of the rotor at the frequency analyzed by the analyzer.

4. The wind turbine generator as claimed in claim 1,
   wherein the analyzer analyzes phase of the vibration component detected by the sensor, and
   the control device controls the rotor so that the fluctuation of the rotor is caused in opposite phase to the phase analyzed by the analyzer, and at a predetermined frequency.

5. The wind turbine generator as claimed in claim 1, wherein the control device controls the rotor so as to avoid fluctuation of the rotor at a predetermined frequency.

6. The wind turbine generator as claimed in claim 1, wherein the control device controls the rotor by controlling either one or both of the generator and the pitch angle of a blade which composes the rotor.

7. The wind turbine generator as claimed in claim 2, wherein the control device controls the rotor by controlling either one or both of the generator and the pitch angle of a blade which composes the rotor.

8. The wind turbine generator as claimed in claim 3, wherein the control device controls the rotor by controlling either one or both of the generator and the pitch angle of a blade which composes the rotor.

9. The wind turbine generator as claimed in claim 4, wherein the control device controls the rotor by controlling either one or both of the generator and the pitch angle of a blade which composes the rotor.

10. The wind turbine generator as claimed in claim 5, wherein the control device controls the rotor by controlling either one or both of the generator and the pitch angle of a blade which composes the rotor.

11. The wind turbine generator as claimed in claim 1, wherein the control device suppresses the vibration component of the tower by a first operation to reduce a torque of the rotor so that a reaction acts on the tower toward a first direction, and by a second operation to increase the torque of the rotor so that a reaction acts on the tower toward a second direction which is different from the first direction.

12. The wind turbine generator as claimed in claim 11, wherein the control device generates vibration by the first operation and the second operation, and controls the rotor so that the vibration is applied to the tower in an opposite phase to the phase analyzed by the analyzer.

13. The wind turbine generator as claimed in claim 11, wherein the control device controls reducing and increasing of the torque of the rotor by controlling the generator.

14. The wind turbine generator as claimed in claim 13, wherein the control device controls reducing and increasing of the torque of the rotor by controlling an electric current value flowing in a stator coil of the generator.

15. The wind turbine generator as claimed in claim 11, wherein the control device controls reducing and increasing of the torque of the rotor by controlling a pitch angle of a blade of the rotor.

16. The wind turbine generator as claimed in claim 11, wherein the first direction and the second direction are opposite direction from each other.

17. The wind turbine generator as claimed in claim 1, wherein the analyzer analyzes frequency in addition to phase of the vibration component detected by the sensor, and the control device selects, as an object to be controlled, a component of the highest amplitude among a plurality of frequency components of the vibration analyzed by the analyzer.

18. The wind turbine generator as claimed in claim 1, wherein the control device starts controlling the rotor when a signal output by the sensor exceeds a predetermined threshold value.

19. The wind turbine generator as claimed in claim 1, wherein the control device ends controlling the rotor when a signal output by the sensor falls below a predetermined threshold value.

20. The wind turbine generator as claimed in claim 1, wherein the sensor includes at least one of an accelerometer, piezo-electric element, and strain gage.

* * * * *